United States Patent
Paronen

(10) Patent No.: US 10,283,788 B2
(45) Date of Patent: May 7, 2019

(54) FUEL SYSTEM FOR FUEL CELLS

(75) Inventor: Mikael Paronen, Espoo (FI)

(73) Assignee: Stiftelsen Arcada, Helsinki (FI)

( * ) Notice: Subject to any disclaimer, the term of this patent is extended or adjusted under 35 U.S.C. 154(b) by 0 days.

(21) Appl. No.: 14/342,546

(22) PCT Filed: Sep. 4, 2012

(86) PCT No.: PCT/FI2012/050855
§ 371 (c)(1),
(2), (4) Date: Jun. 4, 2014

(87) PCT Pub. No.: WO2013/030465
PCT Pub. Date: Mar. 7, 2013

(65) Prior Publication Data
US 2014/0302409 A1   Oct. 9, 2014

(30) Foreign Application Priority Data
Sep. 4, 2011 (FI) ..................... 20115868

(51) Int. Cl.
*H01M 8/04* (2016.01)
*H01M 8/04082* (2016.01)
(Continued)

(52) U.S. Cl.
CPC ......... *H01M 8/04* (2013.01); *H01M 8/04208* (2013.01); *H01M 8/04798* (2013.01);
(Continued)

(58) Field of Classification Search
None
See application file for complete search history.

(56) References Cited

U.S. PATENT DOCUMENTS

2003/0124408 A1*  7/2003  Hojo .......... H01M 8/04208
                                                 429/427
2004/0146769 A1*  7/2004  Birschbach ..... H01M 8/04208
                                                 429/410
(Continued)

FOREIGN PATENT DOCUMENTS

EP    1306914 A2    5/2003
EP    1324415 A2    7/2003
(Continued)

*Primary Examiner* — Wyatt P McConnell
(74) *Attorney, Agent, or Firm* — Seppo Laine Oy

(57) ABSTRACT

Fuel cell structure and method of producing electrical energy from a methanol-based initial material. The fuel cell structure is comprised of a fuel cell for decomposing hydrocarbon-based fuel in order to produce electrical energy, a fuel tank from which fuel can be fed into the fuel cell, and a treatment unit for decomposition products, into which unit it is possible to direct the decomposition products of the fuels. The fuel tank and the treatment unit are at least partly separated from each other by a movable wall, and the wall is arranged to move to even out the pressure difference and the volume difference between the fuel tank and the treatment unit. The movable wall makes it possible to remove disadvantageous pressure differences between the fuel tank and the treatment unit, in which case a continuous feed of fuel into the fuel cell is achieved, which feed continues until either the fuel is expended or the treatment of the decomposition products is brought to an end.

15 Claims, 1 Drawing Sheet

(51) Int. Cl.
*H01M 8/04791* (2016.01)
*H01M 8/0662* (2016.01)
*H01M 8/0668* (2016.01)
*H01M 8/1011* (2016.01)

(52) U.S. Cl.
CPC ....... *H01M 8/0662* (2013.01); *H01M 8/0668* (2013.01); *H01M 8/1011* (2013.01); *H01M 8/1013* (2013.01); *Y02E 60/522* (2013.01); *Y02E 60/523* (2013.01)

(56) References Cited

U.S. PATENT DOCUMENTS

| | | |
|---|---|---|
| 2005/0023236 A1 | 2/2005 | Adams et al. |
| 2005/0130009 A1 | 6/2005 | Hasegawa et al. |
| 2006/0115702 A1 | 6/2006 | Kang |

FOREIGN PATENT DOCUMENTS

| | | |
|---|---|---|
| JP | 2006252812 A | 9/2006 |
| WO | WO 2004071781 A2 | 6/2004 |

* cited by examiner

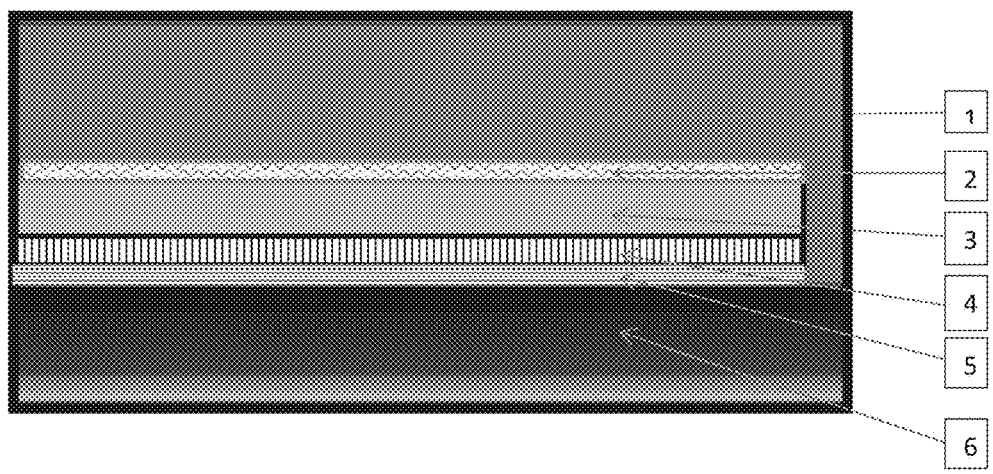

FUEL SYSTEM FOR FUEL CELLS

FIELD OF INVENTION

The present invention relates to a fuel cell structure, according to the preamble of claim 1.

A fuel cell structure such as this usually comprises a hydrocarbon-operated fuel cell which produces electrical energy, and an associated fuel tank from which fuel can be fed into the fuel cell, and a unit for treatment of decomposition products, into which unit it is possible to lead the decomposition product or products of the fuel or the fuels.

BACKGROUND OF THE INVENTION

The fuel cells represent known technology. They are used to convert chemically bound energy into electricity and heat, by bringing the fuel into contact with an oxidising component. The most common fuel is hydrogen, but also hydrocarbons, such as natural gas and particularly its most common derivatives (alcohols, organic acids and aldehydes or ketones), however, in most cases for instance methanol, are used. From methanol it is possible to produce electrical energy by using fuel cells, either indirectly by steam reforming, in which case methanol is first converted into hydrogen, or by directly oxidising methanol into carbon dioxide and water.

Typically, the latter reaction is carried out in the presence of a precious metal catalyst, in a "direct methanol fuel cell". In the anode space of the direct methanol fuel cell, the methanol becomes oxidised in the presence of water, thereby forming mainly carbon dioxide ($CO_2$), protons and electrons, and in the cathode space, the oxygen is correspondingly reduced.

Generation and removal of carbon dioxide is one of the main problems of fuel cells which are based on direct oxidation of methanol. One cause of this problem is that gaseous $CO_2$ is generated in the fuel as a by-product, which, in turn, generates overpressure. Because direct methanol fuel cells are generally used at relatively high temperatures in order to achieve sufficient power density the $CO_2$ that is generated must be discharged from the system, in which case substantial volumes of methanol steam are discharged at the same time.

Elimination of overpressure by flushing out the $CO_2$ leads to a simultaneous discharge of the gasified methanol into the environment, and thereby presents a risk of substantial poisoning and also a risk of an explosion/fire.

There are other problems of the direct methanol fuel cells, such as:
  low current density and thus also low power density—
    which means that the fuel cells are expensive when high power is needed,
  without a system of feeding the fuel, the power of the fuel cell is extremely low, and
  a cell equipped with a fuel feeding system has a substantially improved power density, but the feeding is based on the use of a pump, which thereby causes power losses, and malfunctions.

Publication US2006/0115702 describes a fuel system solution which is comprised of two separate chambers. The tank is connected to a fuel cell and when the cell is operating, the water released from the cathode side is led to the other side of the fuel system. Because of this and because the amount of fuel is decreasing, a movable separating wall in the tank moves along with the water towards the fuel, which compensates for the change in volume. However, the system described in the publication does not remove the main problems associated with direct methanol fuel cells, such as the generation of $CO_2$ and the resulting overpressure. The same applies to those known systems which are described in publications EP 1 306 917, US 2005/0130009, JP 2006252812 and JP2005032702.

Consequently, the overall situation regarding direct oxidation fuel cells remains very problematic.

SUMMARY OF THE INVENTION

The purpose of the present invention is to generate a completely new fuel cell structure with which it is possible to remove at least some of the disadvantages of the known technology.

The present invention is based on the idea that the fuel tank and the treatment unit are at least partly separated from each other in such a way that there is a movable wall between them which can be arranged to move in order to even out the pressure difference, the volume difference or a combination thereof between the fuel tank and the treatment unit. In this case, the decomposition products are led to the unit for treatment of decomposition products by means of a separation means which is selective with regard to the decomposition products to be treated.

More specifically, the solution according to the present invention is characterised by what is stated in the characterising part of Claim 1.

Considerable advantages are achieved with the present invention. Thus, the movable wall makes it possible to remove the disadvantageous pressure differences between the fuel tank and the treatment unit, in which case a continuous feed of fuel into the fuel cell is achieved, which feed continues until either the fuel is expended or the treatment of the decomposition products is brought to an end. No mechanical pumps or valves are needed, in which case the solution is economic and technically reliable.

The fuel tank and the treatment unit for the decomposition products of the fuel together form a compact, two-chamber structure, from the first chamber of which, i.e. the fuel tank, fuel is circulated through the anode space of the fuel cell, into the treatment unit for carbon dioxide. This fuel system can be either refilled or, alternatively, replaced like a cassette, i.e. a used cassette is replaced by another.

The treatment unit comprises an agent which reacts with $CO_2$ thereby forming liquid or solid products. The $CO_2$ is bound by means of a chemical reaction. By this reaction the biggest problem of the direct methanol fuel cells, namely overpressure, can be solved, and therefore a closed system can be constructed, too. The described invention generates a simple structural solution.

BRIEF DESCRIPTION OF DRAWINGS

Most suitably, the whole system is closed and gas-tight. In the following, the present invention will be examined more closely with the aid of a detailed description and the accompanying drawing.

FIG. 1 is a basic diagram of a cross-section of an embodiment of the present fuel cell system.

DETAILED DESCRIPTION OF EXEMPLARY EMBODIMENTS

The following reference numerals are used in the drawing:
1 methanol tank
2 movable separating wall 3 $CO_2$ treatment unit and $CO_2$ reagent tank
4 $CO_2$-selective material
5 input channel system of fuel and outlet channel system of $CO_2$
6 membrane electrode assembly, MEA In the case according to the FIGURE, the present fuel cell system comprises a fuel tank 1, a fuel cell 6 and a treatment unit for carbon dioxide 3, which are connected in series.

The order shown is based on the direction of flow of methanol. The fuel cell 6 comprises an anode and a cathode and between these an electrolyte. The membrane electrode assembly, MEA, is known in the field.

Specifically, the fuel cell 6, the fuel tank 1 and the treatment unit 3 are connected in series in such a way that in the flow direction of the fuel and its decomposition products, the fuel cell is placed in the middle.

From the fuel tank 1 there is a connection to the channel system 5, along which the fuel can be fed into the anode space of the fuel cell, in which space the methanol becomes oxidised into carbon dioxide, according to the following reaction:

$$CH_3OH+H_2O \rightarrow 6H^+ + 6e^- + CO_2$$

Correspondingly, in the cathode space of the fuel cell, oxygen is reduced thereby generating water:

$$\tfrac{3}{2}O_2 + 6H^+ + 6e^- \rightarrow 3H_2O$$

Thus, the overall reaction is the oxidation of methanol into carbon dioxide and water.

The fuel cell comprises fuel input nozzles which have a (liquid/gas) connection to the fuel tank. These input nozzles, hereinafter the input channel systems, are indicated by reference number 5 in the FIGURE. They open out into the anode space of the fuel cell. In one layer, for instance in a plate that is graphite-based, carbon-fibre-based or metallic, also flow channels, i.e. output channels 5, are machined for the carbon dioxide which is released in the anode space of the fuel cell. In the present invention, these are also called the "output nozzles" of the fuel cell 6 and they are generally used for removing the decomposition products of the fuel from the cell. The output nozzles are connected to the treatment unit 3 for the decomposition products.

In one embodiment, there is an unobstructed access from the fuel tank 1 to the fuel cell 6, in which case the quantity of the feed of the fuel varies according to the pressure difference or the volume difference, or the pressure difference and the volume difference, between the fuel tank and the treatment unit.

The carbon dioxide, which is led from the anode space through the carbon dioxide outlet channels 5, is transported through such a material layer 4 which is able to separate carbon dioxide from water and methanol. More specifically, such an element, like a membrane, is selective regarding the decomposition products. Thus, this means that it lets through only the products which are generated in the anode space of the fuel cell, i.e. essentially $CO_2$ generated from the hydrocarbons. The material used can be a polymer membrane having a suitable pore size, especially nano-grade and smaller pores.

After that, the oxide gases of the carbon are directed into the $CO_2$ treatment unit, which has the reference number 3, and into the tank of reagent which reacts with $CO_2$. Typically, this space comprises alkali hydroxide or alkali earth metal hydroxide or their oxide, which is capable of binding the carbon dioxide by means of a chemical reaction.

The materials can be present in a solid state, i.e. as powder or granules, or in a solution, for instance aqueous solution; or, they can be present impregnated into a carrier. The last-mentioned represents a solution in which concentrated alkali metal hydroxide, such as sodium or potassium hydroxide, is absorbed onto a porous paper (such as blotting paper) or cardboard. The carrier increases the absorbing surface of the reagent and thus also the reaction rate.

Both the methanol tank 1 and the carbon dioxide treatment unit tank 3 are made for instance of polymer material and they are connected to each other in such a way that their walls are at least partly in direct contact with each other. It is also possible to construct the methanol tank and the carbon dioxide tank as a two-chamber structure, one of which is filled with methanol and the other with an agent which is a carbon dioxide-binding agent.

Essentially, the wall 2 between the fuel tank and the carbon dioxide treatment unit is movable, in order to even out the pressure difference between the tank spaces.

In one embodiment, the other walls of the tanks are rigid, in which case the wall which separates the tank spaces is movable, like a piston. The wall which separates the tank spaces can also be made of a flexible and elastic material, in which case it expands into the space having a lower pressure.

In one embodiment, the treatment unit for the decomposition products comprises a tank made of polymer material, and its wall opposite to the fuel tank is made of a flexible material, in which case it moves as a function of the pressure difference and the volume difference between the liquid space or, correspondingly, the gas space of the treatment unit and the fuel tank 1.

The present invention is used as follows:

When the fuel tank 1 is replaced or filled, fuel that is both gaseous and liquid starts to flow into the channel system 5. When a reaction takes place in the anode space of the fuel cell 6, it starts to generate $CO_2$ in the cell, which CO2 starts to spread through the outlet channel system 5 and the selective membrane 4, towards the $CO_2$ treatment unit 3.

When the $CO_2$ gas arrives in the $CO_2$ treatment unit 3, a reaction takes place between the $CO_2$ and a chemical reagent, which reacts with it, which is placed into the $CO_2$ treatment unit 3. As a result of the reaction the $CO_2$ is bound to a new compound and thus changes its state from a gas to a solid or a liquid. As a result of this change of state, the overpressure in the system becomes temporarily unstable, in other words, compared to the other parts of the cell system, a slight underpressure is generated in the $CO_2$ treatment unit 3. The underpressure, in turn, causes more $CO_2$ to start flowing into the $CO_2$ treatment unit.

Consequently, the abovementioned process results in a continuous flow of fuel from the fuel tank 1 to the anode space of the fuel cell 6, and in a continuous transition of the $CO_2$ and a changing of its state in the $CO_2$-treatment unit, i.e. in the fuel system of the fuel cell without the need for a pump.

The system works automatically until a substantial change takes place in the $CO_2$ reagent and its reacted compound, as well as in the fuel volumes. In this case, a relative underpressure starts to form on the side of the fuel tank 1 and, correspondingly, an overpressure on the side of the $CO_2$ treatment unit 3.

In order to ensure continuous operation of the fuel system, and to compensate for the abovementioned disadvantage, the fuel system is constructed in such a way that there is a shared interface, i.e. for instance a wall which limits the volume, for the fuel tank and the $CO_2$ treatment unit. If the shared wall 2 is movable or elastic, a disadvantageous pressure difference is thus equalized, and thereby a continuous feed of fuel into the fuel cell is made possible, and the operation of the fuel cell until either the fuel or the $CO_2$ reagent is expended.

Although the present invention is described above with the aid of a drawing as being associated with a technique based on direct oxidation of methanol, it is obvious that the invention is also suitable for treatment of other hydrocarbon-based fuels in a fuel cell. Methanol and other hydrocarbon-based fuels can be used as such or as mixtures, especially water miscible compounds can be used as aqueous solutions. Typical concentrations are 1-10% by volume alcohol, for instance methanol, in water.

In summary, preferable embodiments of the present invention are:
- a separation means (4) is arranged to remove from the stream of decomposition products which are directed into a treatment unit (4) those products which are to be left untreated in the treatment unit, in other words, the system comprises a separation means the purpose of which is to let through only such chemical compounds;
- the fuel tank (1) and the tank of the treatment unit (3), and the anode space of the fuel cell (6) together form a closed unit which is gas—and liquid-tight—the whole system is closed and gas-tight;
- the fuel cell structure is arranged to decompose hydrocarbon-based fuel by direct oxidation in the anode space of the fuel cell (6), in which case the decomposition products of the fuel comprise carbon dioxide and water, and;
- the treatment unit (3) for the decomposition products comprises an agent which is capable of reacting with decomposition products, mainly carbon dioxide, generated in the fuel cell, especially in such a way that liquid or solid compounds can be generated from them.

The invention claimed is:

1. A fuel cell system which comprises:
a fuel cell which decomposes hydrocarbon-based fuel in order to produce electrical energy,
a fuel tank, from which fuel can be fed into the fuel cell, the fuel tank comprising walls and
a treatment unit for treatment of decomposition products into which the decomposition products of fuel can be directed, the treatment unit comprising walls
wherein
the fuel tank and the treatment unit are partly separated from each other by a movable shared wall,
and wherein the walls, apart from the movable shared wall, of both the fuel tank and the treatment unit are rigid, wherein the rigid walls do not expand as a function of the pressure difference and the volume difference between the liquid space or, correspondingly, the gas space of the treatment unit and the fuel tank,
the movable shared wall is arranged to move in order to even out pressure difference, volume difference or both of them, between the fuel tank and the treatment unit,
the decomposition products are led to the treatment unit for decomposition products, through a separation means which is selective with regard to the decomposition products to be treated,
the movable shared wall is made of a flexible material, in which case the said movable shared wall expands as a function of the pressure difference and the volume difference between the liquid space or, correspondingly, the gas space of the treatment unit and the fuel tank.

2. The system according to claim 1, wherein the fuel cell comprises fuel input nozzles for the fuel, which input nozzles are connected to the fuel tank.

3. The system according to claim 1, wherein the fuel cell comprises outlet nozzles for the decomposition products of the fuel, which outlet nozzles are connected to the treatment unit for decomposition products.

4. The system according to claim 3, wherein the separation means is arranged between the outlet nozzles of the fuel cell and the treatment unit for decomposition products.

5. The system according to claim 4, wherein the separation means is arranged to remove, from the flow of the decomposition products which are directed into the treatment unit, those products which are to be left untreated in the treatment unit.

6. The system according to claim 1, wherein the fuel tank structure is arranged to decompose hydrocarbon-based fuel by using direct oxidation in the anode space of the fuel cell, in which case the decomposition products of the fuel are comprised at least of carbon dioxide and water.

7. The system according to claim 1, wherein the treatment unit for decomposition products comprises an agent which is capable of reacting with the decomposition products which are generated in the fuel cell.

8. The system according to claim 7, wherein the agent is capable of reacting with carbon dioxide and with which it is possible to transform the carbon dioxide into a liquid or solid compound.

9. The system according to claim 1, wherein the treatment unit for decomposition products comprises a tank made of polymer material, and its wall opposite to the fuel tank is made of a flexible material, in which case it moves as a function of the pressure difference and the volume difference between either the liquid space or, correspondingly, the gas space of the treatment unit and the fuel tank.

10. A system according to claim 1, wherein the fuel cell, the fuel tank and the treatment unit are connected in series in such a way that the fuel cell is placed in the middle in the flow direction of the fuel and its decomposition products.

11. A system according to claim 1, wherein there is an unobstructed access from the fuel tank to the fuel cell, in which case the quantity of the feed of the fuel varies according to the pressure difference or the volume difference, or the pressure difference and the volume difference, between the fuel tank and the treatment unit.

12. A system according to claim 1, wherein the treatment unit comprises an alkaline agent as a solid material, as a solution or absorbed into a carrier.

13. A system according to claim 1, wherein the movable shared wall is configured to equalize pressure differences in the system to allow a continuous flow of fuel from the fuel tank.

14. The system according to claim 1, wherein the flexibility of the shared wall is such that pressure differences between the treatment unit and fuel tank may be equalized, allowing for a continuous flow of fuel from the fuel tank.

15. The system according to claim 1, wherein the system is pumpless.

* * * * *